United States Patent
Isoda et al.

(10) Patent No.: US 8,331,957 B2
(45) Date of Patent: Dec. 11, 2012

(54) MOBILE TERMINAL, CONTEXT MANAGEMENT SERVER, APPLICATION REGISTRATION SERVER, AND APPLICATION EXECUTION METHOD

(75) Inventors: Yoshinori Isoda, Yokohama (JP); Shoji Kurakake, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1035 days.

(21) Appl. No.: 11/912,338

(22) PCT Filed: May 16, 2006

(86) PCT No.: PCT/JP2006/309727
§ 371 (c)(1),
(2), (4) Date: Oct. 23, 2007

(87) PCT Pub. No.: WO2006/123649
PCT Pub. Date: Nov. 23, 2006

(65) Prior Publication Data
US 2009/0070030 A1 Mar. 12, 2009

(30) Foreign Application Priority Data
May 18, 2005 (JP) .................................. 2005-145706

(51) Int. Cl.
*H04W 24/00* (2009.01)
(52) U.S. Cl. .................. 455/456.3; 455/414.1; 455/418; 455/456.1; 455/456.2
(58) Field of Classification Search .................. 455/414, 455/456, 456.3; 705/26; 709/9, 224, 225
See application file for complete search history.

(56) References Cited

U.S. PATENT DOCUMENTS

| | | | |
|---|---|---|---|
| 2002/0122055 A1* | 9/2002 | Parupudi et al. | 345/737 |
| 2003/0085870 A1* | 5/2003 | Hinckley | 345/156 |
| 2004/0153373 A1* | 8/2004 | Song et al. | 705/26 |
| 2005/0003804 A1* | 1/2005 | Huomo et al. | 455/414.1 |

(Continued)

FOREIGN PATENT DOCUMENTS
JP 11 203006 7/1999
(Continued)

OTHER PUBLICATIONS

Seiie Jang, et al., "Context based Application Service Model for ubiHome", Journal of Korean Institute of Information Scientists and Engineers (KIISE): Software and Applications, vol. 30, No. 6, Jun. 2006, pp. 550-558.

(Continued)

*Primary Examiner* — Wesley Kim
*Assistant Examiner* — Dinh P Nguyen
(74) *Attorney, Agent, or Firm* — Oblon, Spivak, McClelland, Maier & Neustadt, L.L.P.

(57) ABSTRACT

A mobile terminal that executes an application using context information in a plurality of environments in which determined context information is different. A storage stores an environment ID indicating environment in which a user is located and corresponding context information indicating user's context in association with an application ID; a receiver receives one environment ID and one condition determination result information from a context management server assigned in each environment, for delivering one environment ID indicating the environment and one condition determination result information indicating the user's context in the environment; a determining mechanism determines the application ID stored in the storage based on one environment ID and one condition determination result information received by the receiver means; and an execution mechanism executes the application corresponding to the application ID determined by the determining mechanism.

18 Claims, 9 Drawing Sheets

U.S. PATENT DOCUMENTS

2005/0071429 A1\* 3/2005 Hettish et al. ................ 709/204

FOREIGN PATENT DOCUMENTS

JP 2002 259422 9/2002

OTHER PUBLICATIONS

Wakayama, et al., "Device-Independent Middle Wear for Wearable computing", Information Processing Society of Japan Kenkyu Hokoku, vol. 2000, No. 21, pp. 61-66, 2000.

Nishigaki, et al., "Framework and a Rule-based Language for Facilitating Context-aware Computing using formation Appliances", Information Processing Society of Japan Kenkyu Hokoku, vol. 2004, No. 112, pp. 21-27, 2004.

Isoda, et al., "A User Activity Assistance System Using State-sequence Models in Ubiquitous Environment", Transactions of Information Processing Society of Japan, vol. 44, No. 12, pp. 3014-3023, 2003.

Cheverst, et al., "Developing a Context-aware Electronic Tourist Guide: Some Issues and Experiences", Proceedings of the 2000 Conference on Human Factors in Computing Systems, pp. 17-24, 2000.

Dey, et al., "The Context Toolkit: Aiding the Development of Context-Enabled Applications", Proceedings of the 1999 Conference on Human Factors in Computing Systems, pp. 434-441, 1999.

Daniel Siewiorek, et al., "SenSay: A Context-Aware Mobile Phone", http://www.cs.cmu.edu/afs/cs.cmu.edu/misc/mosaic/common/omega/Web/People/aura/docdir/sensay_iswc.pdf, May 29, 2003, 10 pages.

Michiharu Takemoto et al., "A context-aware provision service based on a ubiquitous service-oriented network framework", Symposium on Applications and the Internet Workshops IEEE Computer Society, XP-002488320, Feb. 4, 2005, pp. 204-207.

Yoshinori Isoda et al., "Ubiquitous sensors based human behavior modeling and recognition using a spatio-temporal representation of user states", Advanced Information Networking and Applications, 18th International Conference on Fukuoka, Japan, vol. 1, Mar. 29-31, 2004, pp. 512-517.

Stephen S. Yau et al., "Reconfigurable context-sensitive middleware for ADS applications in mobile ad hoc network environments", Proceedings 5th International Symposium on Autonomous Decentralized Systems IEEE Comput, XP-002488321, 2001, pp. 319-326.

Bin Wang et al., "Reconfigurable context-sensitive middlewars for pervasive computing", IEEE Pervasive Computing, IEEE Service Center, vol. 1, No. 3, Jan. 1, 2002, pp. 33-40.

Japanese Office Action issued Jun. 14, 2011, in Patent Application No. 2005-145706 (with English-language translation).

\* cited by examiner

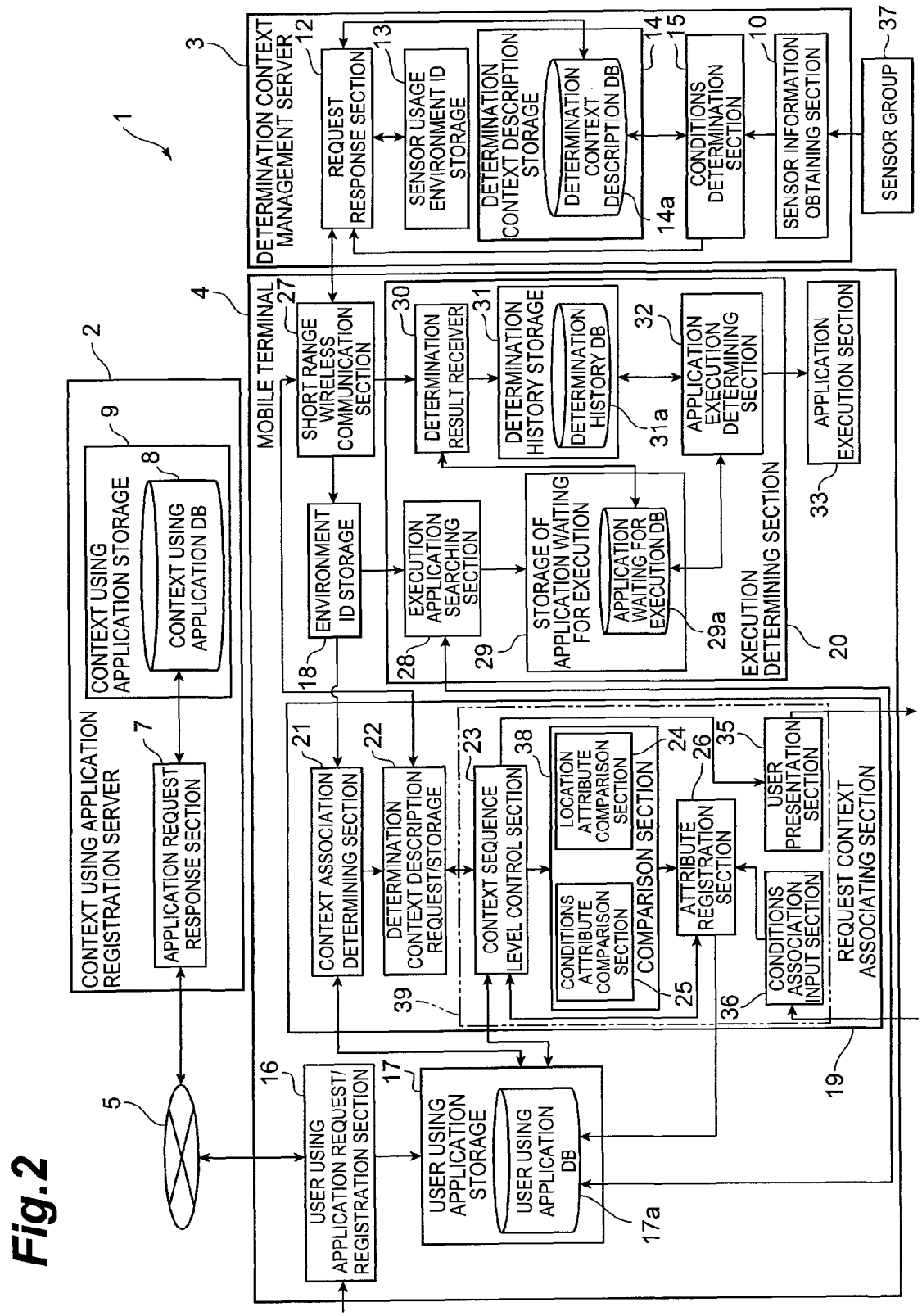

Fig. 3

| APPLICATION ID | APPLICATION POINTER | SEQUENCE 1 | | SEQUENCE 2 | | SEQUENCE 3 | | SEQUENCE 4 | | SEQUENCE 5 | | SEQUENCE 6 | | ... | SEQUENCE L | |
|---|---|---|---|---|---|---|---|---|---|---|---|---|---|---|---|---|
| | | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | | LOCATION ATTRIBUTE | CONDITIONS ATTRIBUTE |
| 1 | URL1 | $^1L$ | Cx | * | * | $^2L$ | not(Cy) | * | * | $^3L$ | Cz | — | — | ... | — | — |
| 2 | PATH1 | LocF | Sv | LocF | * | LocF | St | — | — | — | — | — | — | ... | — | — |
| 50 | URL2 | LocH | Cp | LocH | Cq | LocH | Cr | * | * | LocH | Cs | — | — | ... | — | — |

REQUEST CONTEXT INFORMATION

Fig.5

| APPLICATION ID | APPLICATION POINTER | REQUEST/ CORRESPONDING CONTEXT | SENSOR USAGE ENVIRONMENT ID | CONTEXT SEQUENCE | | | | | | | | | | | | |
|---|---|---|---|---|---|---|---|---|---|---|---|---|---|---|---|---|
| | | | | SEQUENCE 1 | | SEQUENCE 2 | | SEQUENCE 3 | | SEQUENCE 4 | | SEQUENCE 5 | | ... | SEQUENCE L | |
| | | | | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | LOCATION ATTRIBUTE | CONDITIONS ATTRIBUTE | ... | LOCATION ATTRIBUTE | CONDITIONS ATTRIBUTE |
| 1 | URL1 | REQUEST CONTEXT INFORMATION | N/A | $L_1$ | Cx | * | * | $L_2$ | not(Cy) | * | * | $L_3$ | Cz | ... | — | — |
| | | CORRESPONDING CONTEXT INFORMATION | Eid_1 | Loc1 | Cx | * | * | Loc2 | not(Cy) | * | * | Loc3 | Cz | ... | — | — |
| | | CORRESPONDING CONTEXT INFORMATION | Eid_2 | LocCa | Cx | * | * | LocCd | not(S2) | * | * | LocCe | Cz | ... | — | — |
| | | CORRESPONDING CONTEXT INFORMATION | Eid_k | LocX | Cx | * | * | LocY | not(Cy) | * | * | LocZ | Cz | ... | — | — |
| 2 | PATH1 | REQUEST CONTEXT INFORMATION | N/A | LocF | Sv | LocF | * | LocF | St | — | — | — | — | ... | — | — |
| | | CORRESPONDING CONTEXT INFORMATION | Eid_1 | LocF | Sv | LocG | * | LocG | St | — | — | — | — | ... | — | — |
| | | CORRESPONDING CONTEXT INFORMATION | Eid_i | LocK | Sv | LocK | * | LocK | St | — | — | — | — | ... | — | — |
| 50 | URL2 | REQUEST CONTEXT INFORMATION | N/A | LocH | Cp | LocH | Cq | LocH | Cr | * | * | LocH | Cs | ... | — | — |
| | | CORRESPONDING CONTEXT INFORMATION | Eid_3 | LocH | Cp | LocH | Cq | LocH | Cr | * | * | LocH | Cs | ... | — | — |
| | | CORRESPONDING CONTEXT INFORMATION | Eid_k | LocH | S1 | LocH | S2 | LocH | S3 | * | * | LocH | S4 | ... | .. | .. |

*Fig.6*

| APPLICATION ID | APPLICATION POINTER | SENSOR USAGE ENVIRONMENT ID | CONTEXT SEQUENCE |||||||||||
|---|---|---|---|---|---|---|---|---|---|---|---|---|
| | | | SEQUENCE 1 || SEQUENCE 2 || SEQUENCE 3 || SEQUENCE 4 || SEQUENCE 5 || ... | SEQUENCE L ||
| | | | CONDITIONS | ATTRIBUTE | CONDITIONS | ATTRIBUTE | CONDITIONS | ATTRIBUTE | CONDITIONS | ATTRIBUTE | CONDITIONS | ATTRIBUTE | ... | CONDITIONS | ATTRIBUTE |
| 1 | URL1 | Eid_k | Cx | S1 | * | S2 | not(Cy) | S3 | * | * | Cz | S4 | ... | — | .... |
| 50 | URL2 | Eid_k | S1 | | S2 | | S3 | | * | | S4 | | ... | — | .... |

MOBILE TERMINAL, CONTEXT MANAGEMENT SERVER, APPLICATION REGISTRATION SERVER, AND APPLICATION EXECUTION METHOD

TECHNICAL FIELD

The present invention relates to a mobile terminal on which an application can be executed, a context management server, an application registration server, and an application execution method.

BACKGROUND ART

A system determining user's context (conditions) based on information obtained from a sensor to provide service corresponding to the user's context, is known.

As an example of such system, non-patent document 1 sets forth a system providing guidance information by using user's location information obtained from GPS (Global Positioning System) as user's context information.

Further, non-patent document 2 discloses technology of generating user's context information based on a plurality of sensor information to execute an application corresponding to the generated context information.

[Non-Patent Document 1] Keith Cheverst, Developing a Context-aware Electronic Tourist Guide: Some Issues and Experiences, Proceedings of CHI 2000, Netherlands, April 2000, pp 17-24.

[Non-Patent Document 2] Anind K. Dey, The Context Toolkit: Aiding the Development of Context-Aware Applications, [online], (searched on May 12, 2005), Internet: <URL: http://www.cc.gatech.edu/fce/contexttoolkit/pubs/SEWPC00.pdf>

DISCLOSURE OF THE INVENTION

Problem to be Solved by the Invention

In a system set forth in the above-mentioned non-patent documents 1, the location information as the context information is described in terms of globally unified latitude/longitude. It is necessary to unify standard describing complicated context information in order that the system set forth in the non-patent document 1 applies more complicated context information, which is accompanied by difficulty.

In addition, in technology set forth in the above-mentioned non-patent document 2, the context information which triggers an executing an application at a stage of application development is previously determined. Thus, in the environment in which the available context information is different, an application cannot be executed even in the environment in which the context to be a trigger can be determined.

The present invention has been devised to solve the above-mentioned problems, and its object is to provide a mobile terminal, a context management server, a context usage application registration server and a method of executing a context information using application capable of appropriately executing an application using context information in a plurality of environments in which determined context information is different.

Means for Solving the Problem

In order to solve the problem, the mobile terminal of the present invention comprises a storage means for storing environment specifying information indicating environment in which a user is located and corresponding context information indicating user's context in association with application specifying information for specifying an application to be executed; a receiving means for receiving one environment specifying information and one result information from a context management server assigned in each environment, for delivering the one environment specifying information indicating the environment and the one result information indicating the user's context in the environment; a determining means for determining the application specifying information stored in the storage means based on the one environment specifying information and the one result information received by the receiving means; and an execution means for executing an application corresponding to the application specifying information determined by the determining means.

Further, a method of executing an application of the present invention comprises a receiving step of receiving one environment specifying information and one result information from a context management server assigned in each environment, for delivering the one environment specifying information indicating the environment and the one result information indicating user's context in the environment; a determination step for determining application specifying information stored in a storage means for storing environment specifying information indicating environment in which a user is located, and corresponding context information indicating the user's context, in association with the application specifying information for specifying an application to be executed, based on one environment specifying information and one result information received in the receiving step; and an execution step of executing the application corresponding to the application specifying information determined in the determination step.

According to the present invention, it is possible to previously store the environment specifying information indicating the environment in which the user is located, and the corresponding context information indicating the user's context in association with the application specifying information for specifying the application to be executed; receive one environment specifying information and one result information; determine the stored application specifying information based on the received one environment specifying information and the one result information; and execute the application corresponding to the determined application specifying information. By this configuration, it is possible to appropriately execute the application in each environment even if the user moves in a plurality of environments, in which receivable result information is different, as the result information, enabling the application to be executed is specified in each environment.

Preferably, the storage means further stores in advance request context information which is a requirement for executing an application and indicates user's context, in association with the application specifying information; and where further includes: an obtaining means for obtaining determination context descriptive information from the context management server delivering determination context descriptive information describing a set of context element for determining the user's context, when one environment specifying information received by the receiving means is not stored in the storage means in association with each of the application specifying information; and a generating means for generating corresponding context information based on the request context information stored in the storage means and the determination context descriptive information obtained by the obtaining means, and storing the generated corresponding context information and the environment specifying information in the storage means, in association with the application specifying information corresponding to the request context information.

In the method of executing an application of the present invention, preferably, the storage means further stores request context information which is a requirement for executing an application in association with application specifying information and indicates user's context, and where further includes: an obtaining step of previously and obtaining determination context descriptive information from the context management server delivering determination context descriptive information describing a set of context elements for determining user's context, when one environment specifying information received in the receiving step is not stored in the storage means in association with each application specifying information; and a generating step of generating corresponding context information based on the request context information stored in the storage means and the determination context descriptive information obtained by the obtaining means, and storing the generated corresponding context information and the environment specifying information in the storage means, in association with the application specifying information corresponding to the request context information.

According to the present invention, it is possible to previously store the request context information indicating user's context which is a requirement for executing the application in association with the application specifying information, and obtain the determination context descriptive information from the context management server delivering the determination context descriptive information describing a set of context elements for determining the user's context, when the received environment specifying information is not stored; and generate the corresponding context information based on the stored request context information and the obtained determination context descriptive information, and store the generated corresponding context information and the environment specifying information in association with the application specifying information corresponding to the request context information. By this configuration, it is possible to generate the corresponding context information for executing an application even if the user moves to the environment in which the environment specifying information and the corresponding context information are not associated. Thus, it is possible to execute the appropriate application even if the user moves to the environment in which the corresponding context information is not stored.

Further, preferably, the generating means includes: a presentation means for selectably presenting a user with any context elements based on the determination context descriptive information; an input means for accepting any context elements among the context elements presented by the presentation means with the user's input operation, and accepting the accepted context elements as the corresponding context information; and a registration means for storing in the storage means, the corresponding context information accepted by the input means and the environment specifying information received by the receiving means, in association with the application specifying information corresponding the request context information.

According to the present invention, it is possible to selectably present the user with any context elements based on the determination context descriptive information, accept any context elements among the presented context elements with the user's input operation, accept the accepted context elements as the corresponding context information, and store the accepted corresponding context information and the received environment specifying information, in association with the application specifying information corresponding to the request context information. By this configuration, it is possible to generate the corresponding context information using information input by the user even if the user moves to the environment in which the corresponding context information for executing the application cannot be automatically generated, enabling to execute the application according to the user's intention in the environment in which the receivable result information is different.

Further, preferably, in the mobile terminal of the present invention, the request context information contains a location attribute indicating a location where a user is located and a condition attribute indicating the user's context defined according to the location attribute; the determination context descriptive information describes context elements composed of the location attribute indicating a location where the user is located and the condition attribute indicating the user's context defined according to the location attribute in a tree structure; and the generating means extracts the context elements corresponding to the request context information within a search range of the condition attribute defined based on the location attribute contained in the request context information to generate the corresponding context information based on the extracted context elements.

According to the present invention, the request context information contains the location attribute indicating a location where the user is located and the condition attribute indicating the user's context defined according to the location attribute, the determination context descriptive information describes the context element composed of the location attribute indicating a location where the user is located and the condition attribute indicating the user's context defined according to the location attribute in tree structure, and it is possible to extract the context elements according to the request context information within a search range of the condition attribute defined based on the location attribute contained in the request context information. By this configuration, the range within which the context element is extracted may be limited, enabling to reduce a processing for generating the corresponding context information.

Further, preferably, in the mobile terminal of the present invention, the corresponding context information contains information indicating a change in the user's context; the one result information contains information indicating a change in the user's context; and the determining means determines application specifying information based on the corresponding context information and the one result information.

According to the present invention, it is possible that the corresponding context information contains information indicating a change in the user's context, and one result information contains information indicating a change in the user's context, and the application specifying information may be determined based on the corresponding context information and one result information. By this configuration, it is possible to execute the corresponding application based on meticulous information, namely a change in the user's context, enabling to execute the application more appropriately according to the user's context.

A context management server of the present invention comprises an environment specifying information storage means for storing environment specifying information indicating environment; a sensor information obtaining means for obtaining sensor information output from a sensor; a generating means for generating result information based on the sensor information obtained by the sensor information obtaining means, and a transmitting means for transmitting the result information generated by the generating means and the environment specifying information to the above mobile terminal.

According to the present invention, by obtaining the sensor information output from the sensor, generating the result information based on the obtained sensor information, and transmitting to the mobile terminal, the generated result information and the environment specifying information indicating the environment in which the server is assigned as the environment in which the user is located, it is possible to obtain the result information and the environment specifying information that can be appropriately processed in the mobile terminal and cause the mobile terminal to execute the appropriate application.

The context management server of the present invention comprises a context descriptive storage means for storing determination context descriptive information describing a set of context elements for determining user's context; a receiving means for receiving a delivery request of the determination context descriptive information from the above mobile terminal; and a response means for returning the determination context descriptive information stored in the context descriptive storage means, when receiving the delivery request from the receiving means.

According to the present invention, by storing the determination context descriptive information describing a set of context elements for determining the user's context, and returning the stored determination context descriptive information when receiving a delivery request of the determination context descriptive information from the mobile terminal, it is possible that the context management server transmits the determination context descriptive information for generating the corresponding context information even when the corresponding context information does not exist in the mobile terminal. Therefore, it is possible to generate the appropriate corresponding context information even if the user moves to the environment in which the receivable result information is different.

An application registration server according to the present invention comprises a storage means for storing application specifying information for specifying an application, execution information for executing the application corresponding to the application specifying information and request context information indicating requirements of the execution of the application by associating them with one another; and a response means for reading, when receiving application specifying information from the above mobile terminal, the execution information and the request context information corresponding to the received application specifying information from the storage means and returning them.

According to the present invention, it is possible to store the application specifying information for specifying the application by associating it with the execution information for executing the application corresponding to the application specifying information and the request context information indicating requirements of the execution of the application, and read the execution information and the request context information corresponding to the application specifying information when receiving the application specifying information from the mobile terminal to return them. By this configuration, it is possible to transmit to the mobile terminal, the request context information which is requirements of executing the application together with the execution information for defining the destination to save the application, and the mobile terminal may easily obtain the request context information for executing the application together with the execution information.

Effect of the Invention

The present invention makes it possible to appropriately execute an application utilizing context information in a plurality of environments in which the determined context information is different.

BRIEF DESCRIPTION OF THE DRAWINGS

FIG. 2 is a diagram illustrating a functional block configuration of a context information using application providing system according to an embodiment of the present invention.

FIG. 3 is a diagram illustrating an example of a context information using application database according to an embodiment of the present invention.

FIG. 5 is a diagram illustrating an example of a user using application database according to an embodiment of the present invention.

FIG. 6 is a diagram illustrating an example of an application waiting for execution database according to an embodiment of the present invention.

Figure 1:
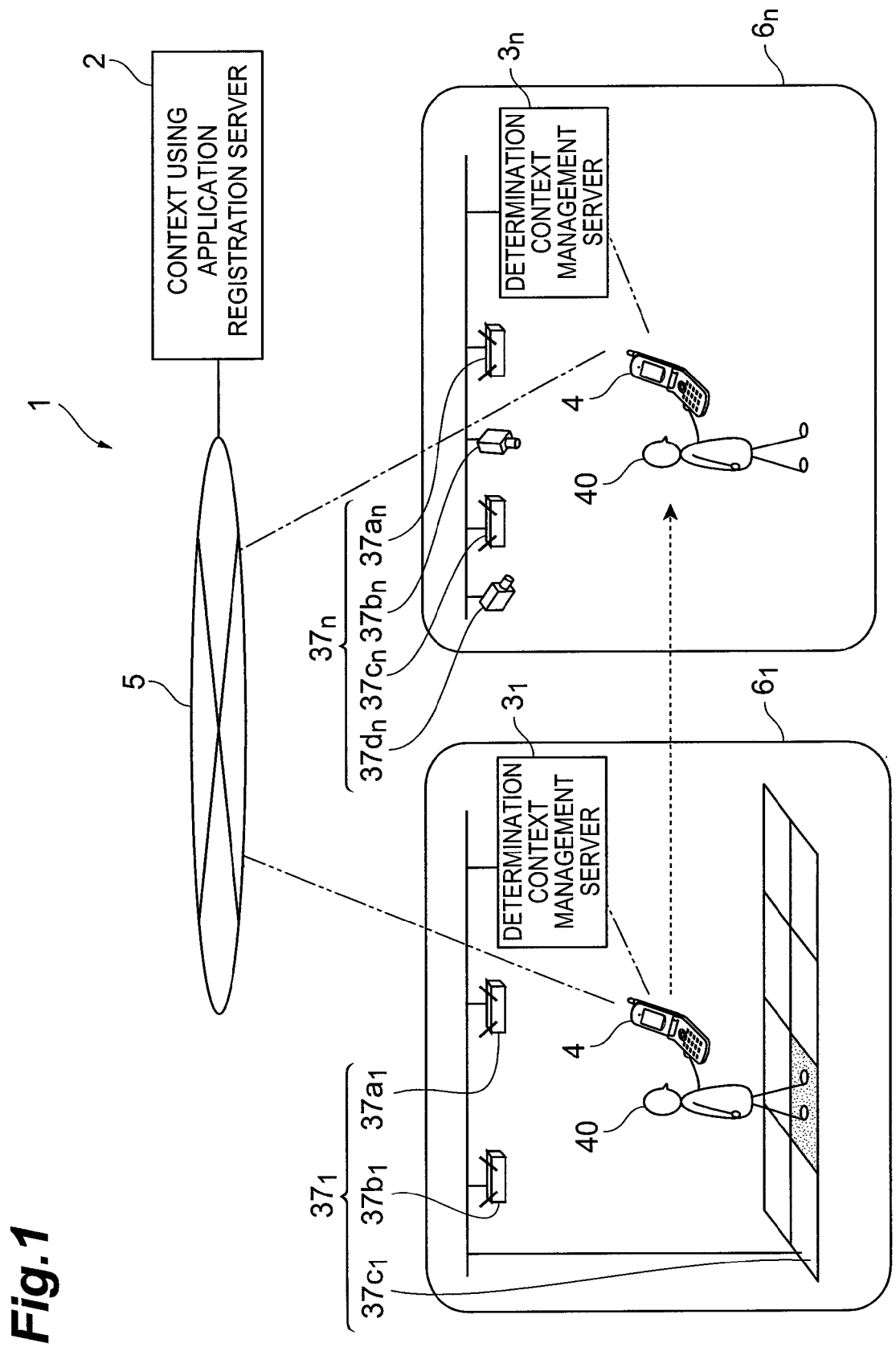
FIG. 1 is a diagram illustrating a context information using application providing system according to an embodiment of the present invention.

DESCRIPTION OF THE REFERENCE SYMBOLS 1 context information using application providing system, 2 context using application registration server, 3, 31~$3_n$ determination context management server, 4 mobile terminal, 61~$6_n$ sensor usage environment, 7 application request response section, 8 context using application database, 9 context using application storage, 10 sensor information obtaining section, 12 request response section, 13 sensor usage environment ID storage, 14 determination context description storage, 14a determination context description database, 15 conditions determining section, 16 user using application request/registration section, 17 user using application storage, 17a user using application database, 18 environment ID storage, 19 request context associating section, 20 execution determining section, 21 context association determining section, 22 determination context description request/ storage, 23 context sequence level control section, 24 location attribute comparison section, 25 conditions attribute comparison section, 26 attribute registration section, 27 short range wireless communication section, 28 execution application searching section, 29 storage of application waiting for execution, 29a application waiting for execution database, 30 determination result receiver, 31 determination history storage, 31a determination history database, 32 application execution determining section, 33 application execution section, 35 user presentation section, 36 conditions association input section, 37a1~37d$_n$ sensor, 38 comparison section, 39 generating section

BEST MODES FOR CARRYING OUT THE INVENTION

Hereinafter, the best modes for carrying out the invention will be described in detail, referring to the accompanying drawings. In addition, when describing the drawings, the same reference numeral will be allocated to the same element, and the overlapping explanation will be omitted.

Referring to FIG. 1, a context information using application providing system 1 will be outlined. The context information using application providing system 1 is configured by comprising a context using application registration server 2 (application registration server), n (n is an integer more than 1) determination context management servers $3_1$~$3_n$ (context management server), and a mobile terminal 4.

The context using application registration server 2 is configured so that it can communicate with a mobile terminal 4 carried by a user 40 via the internet 5, which enables to provide information on an application from the context using application registration server 2 to the mobile terminal 4. The application refers to a information using application which is triggered by the context information which is information indicating the conditions.

The n determination context management servers $3_1$~$3_n$ are provided in n sensor usage environments $6_1$~$6_n$, respectively. Each one of The sensor usage environments $6_1$~$6_n$ has a sensor group $37_1$~$37_n$, which comprises a plurality of sensors. Each of sensors $37_{a1}$~$37_{dn}$ contained in each of sensor groups $37_1$~$37_n$ output conditions detected by them as sensor information. Namely, the sensor usage environment $6_1$~$6_n$ is specific space in which the sensor information which the corresponding sensor groups $37_1$~$37_n$ outputs can be used. Further, the sensor usage environment $6_1$~$6_n$ may be specific space in specific time. The sensors $37_{a1}$~$37_{dn}$ which can be used in each of sensor usage environments $6_1$~$6_n$, are different in kind and number, therefore, even if the same context is detected by them, the sensor information output therefrom is different.

For example, there may be a case where an RFID tag (Radio Frequency Identification) and a tag reader mounted on an article or a human body as a sensor are used in sensor usage environment $6_x$ ($1 \leq x \leq n$, x is an integer), and there may be another case where in other sensor usage environment $6_y$ ($1 \leq y \leq n$, y is an integer), a position sensor disposed on the floor can be used as a sensor. In this case, the location information detected in the sensor usage environment $6_x$ and the location information detected in the sensor usage environment $6_y$ are different.

Hereinafter, any sensor usage environment among the sensor usage environments $6_1$~$6_n$ is set forth as "sensor usage environment 6", and any determination context management server among the determination context management servers $3_1$~$3_n$ is set forth as "a determination context management server 3".

The determination context management server 3 is configured so that it can receive sensor information from a sensor group 37 disposed in the sensor usage environment 6, and configured such that it can determine the context (conditions) of the user 40 in the sensor usage environment 6 based on the received sensor information and output the condition determination result information. The condition determination result information refers to context information indicating the context in the sensor usage environment 6, which is uniquely determined by the determination context management server 3.

The mobile terminal 4 carried by the user 40 moves among each sensor usage environment $6_1$~$6_n$ with the user 40. The mobile terminal 4 is configured such that it can communicate with the determination context management server 3 via short range wireless communication such as a Bluetooth in any sensor usage environment 6. The mobile terminal 4 registers for each application to be executed and in each sensor usage environment 6, the context information indicating the user conditions which triggers an application, obtains the determined user's context information from the determination context management server 3 after recognizing the sensor usage environment 6 in which the user is located, and executes an appropriate application in each sensor usage environment 6.

Subsequently, referring to FIG. 2, each device configuring the context information using application providing system 1 will be described in detail. FIG. 2 shows a functional block configuration of the context information using application providing system 1.

The context using application registration server 2 comprises an application request response section 7 (response means) and a context using application storage 9 (storage means).

The context using application storage 9 is a section for storing an application ID (application specifying information) discriminating an application, an application pointer (execution information), and request context information indicating the context which is to trigger the application in a context using application database 8 by associating them with one another. The application pointer refers to a URL where the substance of an application exits, or information indicating PATH to where the application is stored. Further, the execution information may be an application itself.

FIG. 3 shows a configuration of the context using application database 8. In the context using application database 8, the application ID, the application pointer, and request context sequences which are the request context information of sequences 1 to L, are stored by being associated with one another.

The application may include an application which is executed when having reached the predetermined conditions indicated by one request context information, and an application which is executed when having passed through a plurality of predetermined conditions indicated by a plurality of request context information. One or a plurality of request context information is allocated to an application. Further, sequence numbers indicating a time-sequence order are allocated to the request context information which includes information indicating the user's context change. The application is executed if the conditions indicating the request context information of the sequence 1 in order from the conditions indicating the request context information of the sequence L (L is an integer more than 1) have been determined. Further, the request context information includes location attribute indicating a location where the user is located and conditions attribute indicating the user's context.

For example, an application, an ID of which is "1" shown in FIG. 3 will be described in detail. The application, an ID of which is "1" is an application in that "sounding an alarm from a mobile terminal in case of not washing hands although having used a lavatory". The location attribute "1L" which is the request context information of the sequence 1 indicates a location, "in front of a lavatory", and the condition attribute "Cx" indicates conditions of "standing in front of a lavatory".

The location attribute "*" and the condition attribute "*" which are the request context information of the sequence 2 and the sequence 4 indicate any location and any conditions, respectively. The location attribute "2L" which is the request context information of the sequence 3 indicates a location, "in front of faucet of a lavatory", and the condition attribute "not (Cy)" indicates conditions of "the condition attribute Cy, (washing hands) does not occur". The location attribute "3L" which is the request context information of the sequence 5, indicates a location "inside a lavatory", and the condition attribute "Cz" indicates a conditions, "sitting on a lavatory seat".

Back to FIG. 2, the application request response section 7 is a section receiving the application ID from the mobile terminal 4 and returning the application pointer and the request context information stored in the context using application database 8 by being associated with the received application ID.

Subsequently, the determination context management server 3 will be described. The determination context management server 3 is configured by comprising a sensor information obtaining section 10 (sensor information obtaining means), a request response section 12 (transmitter, receiver, response means), a sensor usage environment ID storage 13 (environment specifying information storage means), a determination context description storage 14 (context description storage means), and a condition determining section 15 (generating means).

The sensor information obtaining section 10 obtains sensor information output from the sensor groups $37_1 \sim 37_n$. The sensor information obtaining section 10 outputs the obtained sensor information to the condition determination section 15.

The determination context description storage 14 stores in the determination context description database 14a, the determination context descriptive information describing the determinable context based on the sensor information. The determination context descriptive information includes the user's context information (context elements) indicating the user's context that can be determined by the determination context management server 3. The user's context information contains location attribute indicating a location and condition attribute indicating conditions.

In addition, each user context information has a mutual relationship specified by a tree structure for stepwise classifying user's context. The tree structure for stepwise classifying refers to a segmented structure through conceptual stages from a superordinate concept to subordinate concept. The more segmented user's context information indicates the more detailed user's context.

Figure 4:
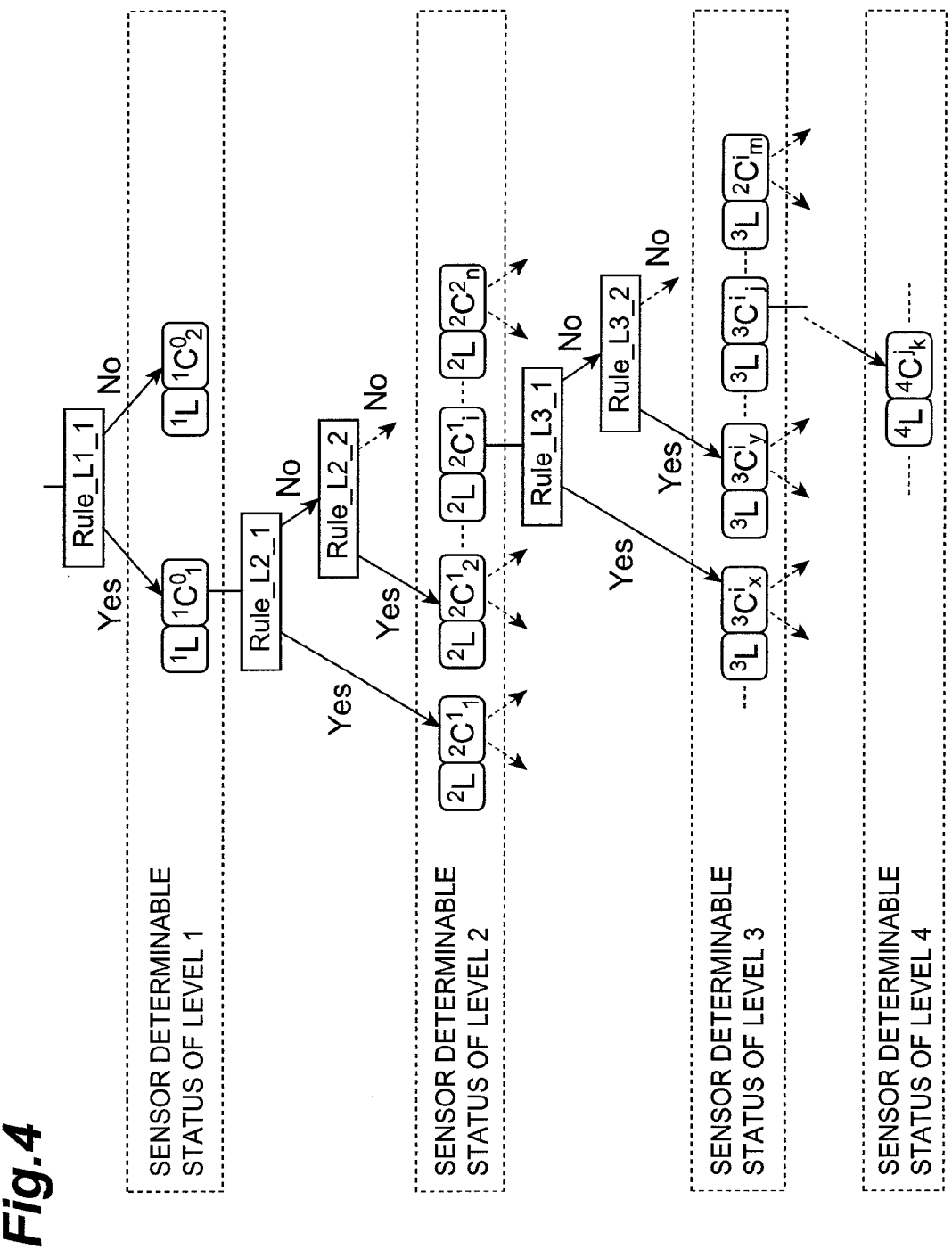
FIG. 4 is a diagram illustrating an example of determination context descriptive information according to an embodiment of the present invention.

Referring to FIG. 4, the determination context descriptive information and its tree structure will be described. Each user condition information is expressed by each node which is a branch point of the tree structure. Each node is defined by a rule that can be determined by the obtainable sensor information. Namely, a rule is designed to define the more segmented user's context information. The rule defines according to a level indicating the segmented step. The level of the user context information is defined by a level of the rule defining a node indicating the user context information.

For example, in FIG. 4, the first rule of a level 1 defining the highest node, "Rule_L1_1" is defined as "a position sensor in front of a lavatory or in a lavatory reacts", then the highest user context information can be determined by the sensor information output from the position sensor installed in front of a lavatory or in a lavatory.

If YES to the rule "Rule_L1_1", it is determined that the user is acting in connection with a lavatory". Then the user context information corresponding to this context covers "$^1L$" indicating "a lavatory" for the location attribute and "$^1C^0_1$" indicating "acting in connection with a lavatory" for the conditions attribute. Further, if NO to the rule "Rule_L1_1", it is determined to be in a state other than "acting in connection with a lavatory", and the condition attribute indicating the condition is "$^1C^0_2$".

Further, rules "Rule_L2_1, Rule_L2_2" of a level 2 determining in more detail the user context information "$^1L, ^1C^0_1$" which is the first node of the level 1 is provided. The Rule_L2_1 is defined as "an RFID tag which is designed to send a signal if a faucet of a lavatory is turned on, sends a signal", then if YES, the conditions of the user "washing hands" is determined, and the condition attribute "$^2C^1_1$" indicating the condition is specified. The Rule_L2_2 is defined as "an RFID tag which is designed to send a signal if sitting on a lavatory seat, sends a signal", then if YES, the condition of the user "using a lavatory" is determined, and the condition attribute "$^2C^1_2$" indicating the condition is specified.

The user context information is described by containing a level number indicating a level as tree structure information, a node number discriminating the user context information in the level to which the user context information belongs, and a higher node number which is a node number of the user context information of a next higher level. The level number is indicated by a superscript on the upper left side of the location attribute and the conditions attribute, and the node number is indicated by a subscript on the lower right side of the conditions attribute, and the higher node number is indicated by a superscript on the right side of the condition attribute. Thus, a relation in the tree structure of each user context information can be figured out by the level number, the node number, and the higher node number contained in the user context information.

Back to FIG. 2, the condition determining section 15 determines the user context information based on the sensor information and the determination context descriptive information to generate the condition determination result information. The condition determination section 15 outputs the generated condition determination result information to the request response section 12.

The sensor usage environment ID storage 13 stores a sensor usage environment ID (environment specifying information) (e.g., E-ID1 to E-IDn) discriminating the sensor usage environment 6 in which the determination context management server 3 is disposed. In addition, the environment specifying information is not limited to the sensor usage environment ID, but may be information enabling to specifying the environment.

The request response section 12 returns the sensor usage environment ID stored in the sensor usage environment ID storage 13 via the short range wireless communication according to a request of the sensor usage environment ID made by the mobile terminal 4. Further, the request response section 12 returns the determination context descriptive information stored in the determination context description database 14a via the short range wireless communication according to a request of the determination context descriptive information made by the mobile terminal 4. Still further, the request response section 12 returns the condition determination result information output from the condition determining section 15 via the short range wireless communication according to a request of the condition determination result information made by the mobile terminal 4.

Subsequently, the mobile terminal 4 will be described. The mobile terminal 4 is configured by comprising user using application request/registration section 16, user using application storage 17 (storage means), environment ID storage 18, request context associating section 19, execution determining section 20, short range wireless communication section 27 (receiving means), and application execution section 33 (executing means).

The user using application request/registration section 16 accepts an application ID input by the user, transmits the accepted application ID to the context using application registration server 2, and requests information on the application. Further, the user using application request/registration section 16 receives the application pointer and the request context information returned from the context using application registration server 2 according to a request. The user using application request/registration section 16 outputs the transmitted application ID and the received application pointer and the request context information to the user using application storage 17.

The user using application storage 17 stores the application ID, the application pointer, the request context information, the corresponding context information, and the sensor usage environment ID of the sensor usage environment 6 in the user using application database 17a by associating them with one another. The corresponding context information is the condition determination result information receivable from the determination context management server 3 in the sensor usage environment 6 specified by associated sensor usage environment ID, which is the context information, triggering an execution of an application in the sensor usage environment 6. Further, the corresponding context information is stored by being associated with the request context information of sequences 1 to L, respectively. The corresponding context sequences including the corresponding context information of the sequences 1 to L are stored by being associated with each sensor usage environment ID associated with each application ID. The sensor usage environment ID and the corresponding context sequences are stored by being associated with the application ID, thereby it is designed such that the sensor usage environment ID is registered for the application ID.

Referring to FIG. 5, the user using application database 17a will be described in more detail. FIG. 5 shows a configuration of the user using application database 17a. In the user using application database 17a, the application ID, the application pointer, sequences of the request context information, the corresponding context sequences, and the sensor usage environment ID are stored by being associated with one another. For each application ID as well as each sensor usage environment ID, the corresponding context information is stored, respectively, corresponding to the request context information of each sequence contained in the request context sequences of the application specified by the application ID.

For example, in FIG. 5, the sensor usage environment ID "Eid_1" to "Eid_3" and each corresponding context sequence are associated with the application, an application ID of which is "1". Therefore, the condition determination result information which the determination context management servers $3_1$~$3_3$ of the sensor usage environment $6_1$~$6_3$ can determine, and which is to be a trigger of the application ID "1" can be grasped. In addition, the sensor usage environment ID corresponding to the request context information is described as "N/A", because it does not convey any meaning in FIG. 5.

The short range wireless communication section 27 receives the sensor usage environment ID from the determination context management server 3 via short range wireless communication. The short range wireless communication section 27 regularly retrieves connectable determination context management server 3 using the short range wireless communication. The short range wireless communication section 27 requests the determination context management server 3 the sensor usage environment ID after detecting the connectable determination context management server 3, and receives the sensor usage environment ID that has been returned according to the request. The short range wireless communication section 27 outputs the received sensor usage environment ID to the environment ID storage 18.

Further, the short range wireless communication section 27 receives the determination context descriptive information from the determination context management server 3 via short range wireless communication. The short range wireless communication section 27 requests the determination context descriptive information to the determination context management server 3 according to the request by request context associating section 19. The short range wireless communication section 27 receives the determination context descriptive information that has been returned according to the request, and outputs the received determination context descriptive information to the request context associating section 19.

Still further, the short range wireless communication section 27 receives the condition determination result information from the determination context management server 3 via short range wireless communication. The short range wireless communication section 27 regularly requests the condition determination result information to the connectable determination context management server 3 according to the request by the execution determining section 20. The short range wireless communication section 27 receives the condition determination result information that has been returned according to the request, and outputs the received the condition determination result information to the execution determining section 20.

The environment ID storage 18 stores the sensor usage environment ID which the short range wireless communication section 27 received.

The request context associating section 19 obtains the determination context descriptive information and generates the corresponding context information. The request context associating section 19 comprises a context association determining section 21, determination context description request/storage 22 (obtaining means), and a generating section 39 (generating means).

The context association determining section 21 determines whether the sensor usage environment ID stored in the environment ID storage 18 is stored in the user using application database 17a by being associated with each application ID. Namely, the context association determining section 21 determines, among the application IDs, there exits a non-associated application ID which is not registered by being associated with the sensor usage environment ID stored in the environment ID storage 18. The context association determining section 21 outputs the determination result to the determination context description request/storage 22.

For example, as shown in FIG. 5, the sensor usage environment 6i, an ID of which is "Eid_i" is not stored according to applications, IDs of which are "1" and "50", the application IDs "1" and "50" are non-associated application IDs to the sensor usage environment ID "Eid_i". This means that the corresponding context information is not registered for the request context information of each sequence of the applications, IDs of which are "1" and "50". In FIG. 5, for the request context information of the application of application ID "2", the corresponding context information in the sensor usage environment 6*i* of the sensor usage environment ID "Eid_i" is registered.

Back to FIG. 2, the determination context description request/storage 22 obtains the determination context descriptive information from the determination context management server 3, if the non-associated application exists as a result of the determination by the context association determining section 21. For example, the determination context description request/storage 22 requests the determination context descriptive information to the determination context management server 3*i* via the short range wireless communication 27, if the associated application to the sensor usage environment ID "Eid_i" exists, and stores the determination context descriptive information that has been received via the short range wireless communication 27 according to the request.

The generating section 39 generates the corresponding context information and registers the generated corresponding context information in the user using application database 17*a*. The generating section 39 comprises a context sequence level control section 23, a comparison section 38 (determining means), an attribute registration section 26 (registration means), a user presentation section 35 (presentation means), condition association input section 36 (input means).

The context sequence level control section 23 extracts the request context information of each sequence of the non-associated application from the user using application database 17*a*, and location attribute and condition attribute of the user context information contained in the determination context descriptive information stored in the determination context description request/storage 22 according to predetermined control method described later and outputs them to the comparison section 38.

The context sequence level control section 23 determines whether associating the request context information of the non-associated application ID with user context information contained in the determination context descriptive information has been already tried to specify sequences of the request context information, associating of which will start. The context sequence level control section 23 sequentially outputs the request context information contained in sequences of the specified request context information to the comparison section 38 according to predetermined control method.

The comparison section 38 compares the location attribute and the condition attribute of the user context information with the request context information output from the context sequence level control section 23 to determine whether they coincide. The comparison section 38 comprises a location attribute comparison section 24 determining whether the location attribute of the request context information coincides with that of the user context information, and a condition attribute comparison section 25 determining whether the condition attribute of the request context information coincides with that of the user context information. In addition, as for the determination whether they coincide or not, that is made by the comparison section 38, it may be configured such that it determines that they coincide also in case where comparative objects are partly same. Alternatively, it may be configured such that their perfect coincidence is essential to be determined that they coincide. The comparison section 38 outputs the determination result to the attribute registration section 26.

The attribute registration section 26 generates the corresponding context information based on the determination by the comparison section 38. The attribute registration section 26 generates the corresponding context information by assigning sequence numbers of the request context information that has been coincided to the user context information containing the condition attribute that has been determined to coincide by the comparison section 38, and temporarily stores it. Thus, the user context information is associated with the request context information. The corresponding context information corresponding to each request context information contained in the sequences of the request context information is generated, respectively, then the attribute registration section 26 outputs to the user using application storage 17, the generated corresponding context information as the corresponding context sequences corresponding to the sequences of the request context information.

Subsequently, the predetermined control method by the context sequence level control section 23 will be described. Firstly, the control method of the request context information by the context sequence level control section 23 will be described. The context sequence level control section 23, referring to the attribute registration section 26, selects from the user using application database 17*a*, the location attribute of the request context information, a sequence number of which is smallest among the request context information with which the user context information is not associated, and outputs it to the comparison section 38. The context sequence level control section 23, detects that the output location attribute has been associated, referring to the attribute registration section 26, and then outputs the associated location attribute and its counterpart conditions attribute to the comparison section 38.

Next, a control method of the user context information by the context sequence level control section 23 will be described. The context sequence level control section 23 outputs in order from the location attribute of level number 1 contained in the user context information to the comparison section 38, referring to the tree structure information contained in the determination context descriptive information. The context sequence level control section 23, detects that the location attribute has been associated, referring to the location attribute comparison section 24, and then outputs in ascending order of level numbers to the comparison section 38, the conditions attribute group containing the condition attribute of the user context information in connection with a node of the associated location attribute, having higher level numbers more than the level number of the associated location attribute.

The comparison section 38 comparing the request context information output from the context sequence level control section 23 with the user context information will be described in more detail.

The location attribute comparison section 24 compares the location attribute of the request context information of the sequence k ($1 \leq k \leq L$, L is the number of levels of the request context information) with the location attribute of the user context information of the level i ($1 \leq i \leq M$, M is the number of levels of the determination context descriptive information) to determine. As a result of the determination, if the location attributes do not coincide, the location attribute comparison section 24 compares the location attribute of the request context information of the sequence k with the location attribute of the user conditions information of the level i+1.

The condition attribute comparison section 25 compares the condition attribute of the request context information of the sequence k with the condition attribute of the user context information, of level i more than the level of the associated location attribute, in connection with a node of the location attribute associated by the location attribute comparison section 24 to determine. As a result of the determination, if the condition attributes do not coincide, the condition attribute comparison section 25 compares the condition attribute of the request context information of the sequence k with the condition attribute of the user context information of the level i+1, in connection with the node of the associated location attribute.

Referring to FIGS. 4 and 5, the control method by the context sequence level control section 23 and the comparison by the comparison section 38 will be described more specifically. A case of comparing the request context information "$^2$L, not (Cy)" of a sequence 3 in the application of the application ID "1" in FIG. 5 with the user context information will be described. It is assumed that the location attribute "$^2$L" of the request context information indicates "in front of a lavatory", and the condition attribute "not (Cy)" is described as "conditions other than "washing hands"". Further, it is assumed that the location attribute "$^1$L" of the user context information of the level 1 in FIG. 4 indicates "a lavatory". The location attribute comparison section 24 compares the location attribute "$^2$L" of the request context information output from the context sequence level control section 23 with the location attribute "$^1$L" of the user context information of the level 1 to determine that they do not coincide.

Next, the location attribute comparison section 24, further compares the location attribute "$^2$L" of the request context information with the location attribute "$^2$L" of the user context information of the level 2 output from the context sequence level control section 23. As the location attribute "$^2$L" of the user conditions information of the level 2 indicates "in front of a lavatory", which coincides with the location attribute "$^2$L" of the request context information, and then the location attribute comparison section 24 determines that they coincide.

Next, the condition attribute comparison section 25 compares the location attribute "not (Cy)" of the request context information output from the context sequence level control section 23 with the condition attribute "$^2C^1_1$", "$^2C^1_2$", . . . "$^2C^1_i$", . . . "$^2C^1_n$" of the user context information of the location attribute "$^2$L" of the level 2. In case where the condition attribute "$^2C^1_2$" indicates the condition of "washing hands", which coincides with "Cy", the conditions attribute comparison section 25 determines that they coincide.

The function of the above-mentioned context sequence level control section 23, the comparison section 38, and the attribute registration section 26 may automatically associate the request context information with the user context information contained in the determination context descriptive information. The function of the user presentation section 35 and the condition association input section 36 that will be subsequently described, and the function of the context level control section 23 and the attribute registration section 26 may associate the request context information with the user context information contained in the determination context descriptive information, using information from outside.

The context sequence level control section 23 extracts the condition attribute of the request context information of the non-associated application and the condition attribute of the user context information contained in the determination context descriptive information stored in the determination context description request/storage 22 according to a control method for a presentation, and outputs them to the user presentation section 35. The context sequence level control section 23 extracts the condition attribute group in order from the user context information of level 1. Further, the context sequence level control section 23 may further output the location attribute of the request context information and the user context information to the user presentation section 35.

The user presentation section 35 presents the request context information input from the context sequence level control section 23, and presents selectably the condition attribute contained in the condition attribute group of a specified level input from the context sequence level control section 23. The user presentation section 35 presents the output location attribute when the location attribute has been output from the context sequence level control section 23.

The condition association input section 36 accepts the condition attribute of any user context information presented by the user presentation section 35. The condition association input section 36 outputs to the attribute registration section 26 the determination in that the user context information of the accepted condition attribute as the corresponding context information is stored by the user using application storage 17.

A case where the request context information and the user context information are associated by the user presentation section 35 and the condition association input section 36 will be described in more detail. The determination context descriptive information of the sensor usage environment ID "Eid_2" associated with the request context information of an application ID "1" in FIG. 5 is associated information using determination information from outside. It is assumed that the request context information, "Cx", "Cy", "Cz", of the application ID "1" indicate the conditions of "getting out of a lavatory", "washing hands", "using a lavatory", respectively. On the other hand, it is assumed that the corresponding context sequences, "S1", "S2", "S3", of the sensor usage environment ID "Eid_2" indicate the conditions of "standing in front of a lavatory", "being washing hands", and "sitting on a lavatory seat", respectively. Despite the notational discrepancy of the condition attribute "Cx" of the request context information of a sequence 1 and the corresponding context information "S1", they are associated by information input to the condition association input section 36 and registered in the user using application storage 17. Sequences 3 and 5 are also associated by the information input to the condition association input section 36.

Successively, the execution determining section 20 will be described. The execution determining section 20 determines an execution of an application, configured by comprising an execution application searching section 28, a storage of application waiting for execution 29, a determination result receiver 30, a determination history storage 31, and an application execution determination section (determining means) 32.

The execution application searching section 28 searches the application ID stored in the user using application database 17a by being associated with the sensor usage environment ID stored in the environment ID storage 18. For example, in case where the sensor usage environment ID stored in the environment ID storage 18 is "Eid_k", applications, IDs of which are "1" and "50" stored by being associated with the sensor usage environment ID "Eid_k", are searched from the user using application database 17a shown in FIG. 5. The execution application searching section 28 outputs the searched application ID, the corresponding application pointer, the sensor usage environment ID, and the condition attribute of the determination context descriptive information associated with the request context information, to the storage of application waiting for execution 29.

The storage of application waiting for execution 29 stores in a application waiting for execution database 29a, the application ID, the application pointer, the sensor usage environment ID, and the condition attribute of the determination context descriptive information output from the execution application searching section 28.

FIG. 6 shows an example of the application waiting for execution database 29a. In the application waiting for execution database 29a, the application pointer, the sensor usage environment ID, and the condition attribute of the corresponding context information are stored by being associated with the application ID searched by the execution application searching section 28. In the application waiting for execution database 29a, the sequences of the condition attribute which is the condition information of the corresponding context information of each sequence are stored.

The determination result receiver 30 regularly requests the determination context management server 3 conditions determination result information via the short range wireless communication section 27. The determination result receiver 30 accepts the conditions determination result information received by the short range wireless communication section 27 according to the request and outputs it to the determination history storage 31. The conditions determination result information is output to the determination history storage 31 in the order of the context indicated by the conditions determination result information occurred, thereby, it is configured to contain the information indicating the change in the user's context.

The determination history storage 31 adds to the conditions determination result information, the information indicating the order it has been output from the determination result receiver 30, and stores in the determination history database 31a, a series of the conditions determination result information as a conditions sequence. Namely, the determination history storage 31 stores each conditions determination result information by specifying the order of the context having occurred indicated by each conditions determination result information.

The application execution determination section 32 checks the conditions sequence stored in the determination history database 31a and the sequence of the condition attribute of each application ID stored in the application waiting for execution database 29a to determine whether they coincide. The application execution determination section 32 outputs the application pointer associated with the sequence of the condition attribute that coincides with the condition sequence as a result of the determination, to the application execution section 33.

The determination by the application execution determination section 32 will be described in more detail. For example, in the application waiting for execution database 29a in FIG. 6, in case where the application ID is "1", the sequences of the conditions attribute are "Cx, * not(Cy), *, Cz". These sequences of the conditions attribute mean the conditions in which the present user context is indicated by "Cx". Further, the sequences of the conditions attribute mean that the user context going back from the present to the past is indicated by any conditions, any conditions other than the conditions indicated by "Cy", any conditions, and the conditions indicated by "Cz". The application execution determination section 32 checks such sequences of the condition attribute, are "Cx, *, not(Cy), *, Cz" and the condition sequences stored in the determination history storage 31 to determine.

The application execution section 33 executes the application according to the application pointer output from the determination history storage 31.

Figure 7:
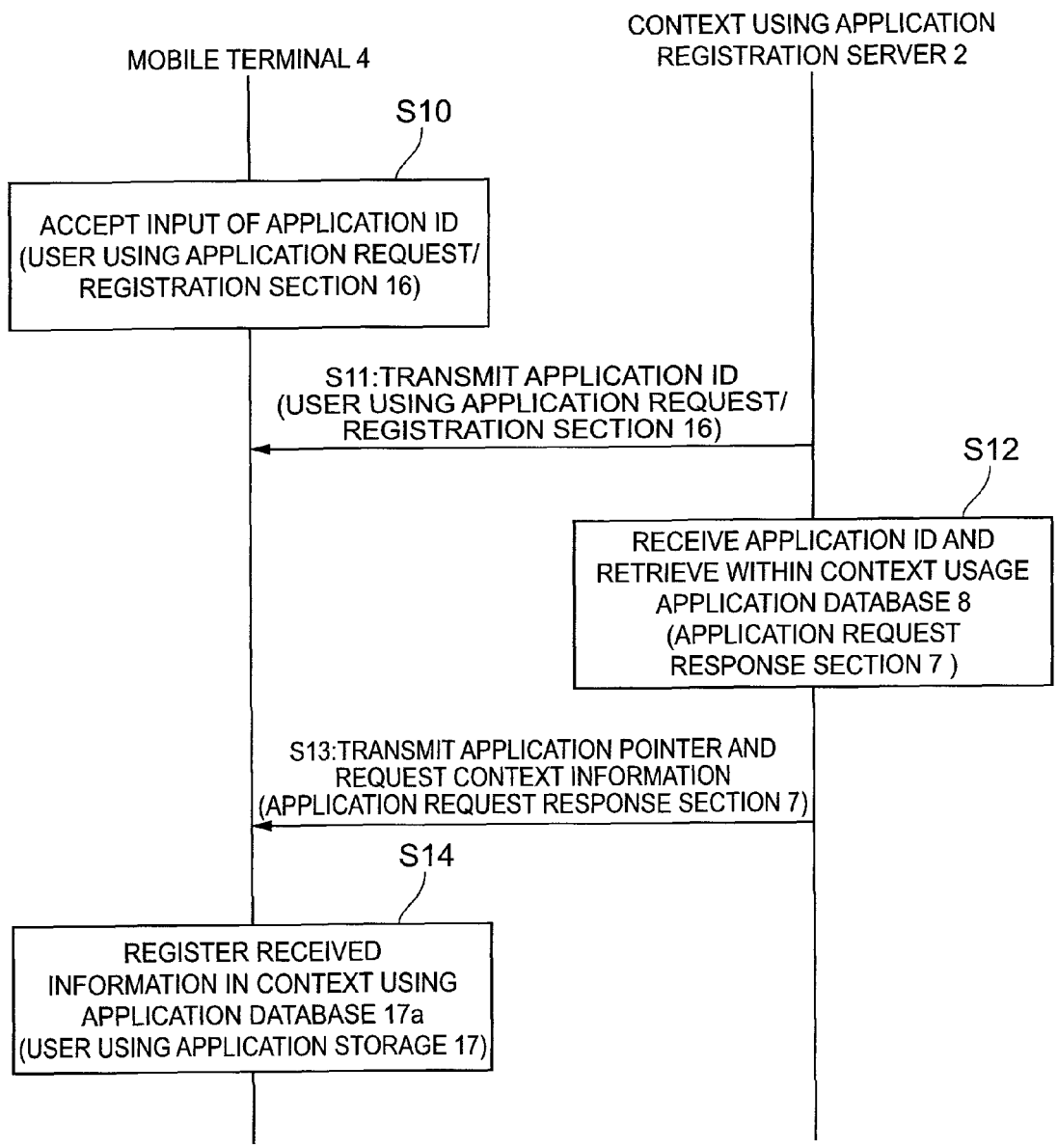
FIG. 7 is a diagram illustrating a flow of registering an application according to an embodiment of the present invention.

Subsequently, a flow of executing procedures in the context information using application providing system 1 will be described. FIG. 7 shows a flow of registering an application in the mobile terminal 4.

The application ID input by a user is accepted by the user using application request/registration section 16 in the mobile terminal 4 (step S10). The application ID has been accepted, then the accepted application ID is transmitted to the context using application registration server 2 by the user using application request/registration section 16 (step S11).

The application ID has been transmitted, then the transmitted application ID is received by the application request response section 7 of the context using application registration server 2, which retrieves in the context using application database 8, the application pointer and the request context information stored by being associated with the received application ID (step S12).

The retrieved application pointer and the request context information are transmitted to the mobile terminal 4 by the application request response section 7 (step S13). The application pointer and the request context information have been transmitted, then the transmitted application pointer and the request context information are received by the user using application request/registration section 16 in the mobile terminal 4, and stored in the user using application storage 17 (step S14). In this way, the application ID, the application pointer and the request context information are registered in the mobile terminal 4.

Figure 8:
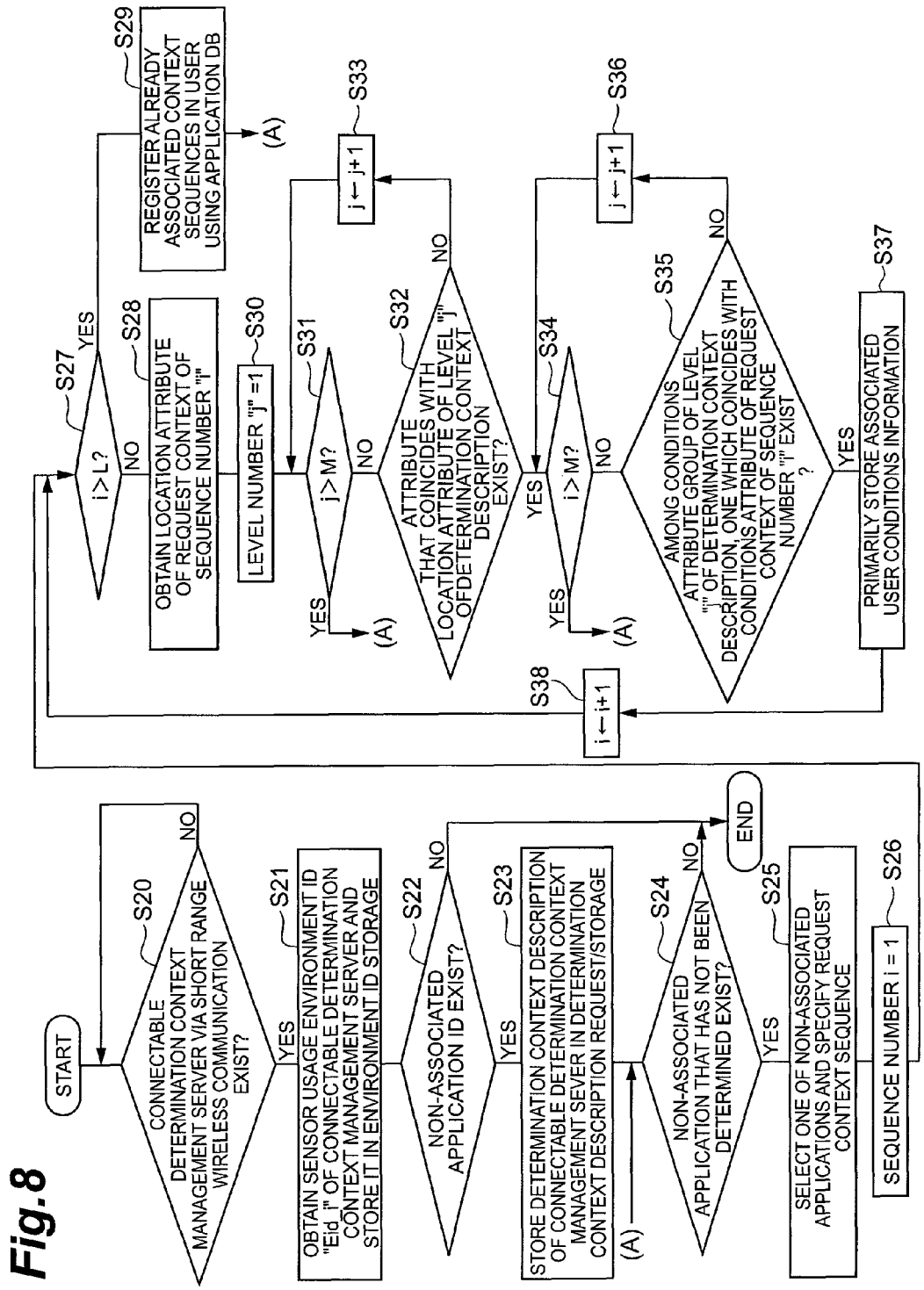
FIG. 8 is a diagram illustrating a flow of associating determination context according to an embodiment of the present invention.

Subsequently, referring to FIG. 8, a flow of automatically associating the request context information and the user context information contained in the determination context descriptive information will be described. FIG. 8 shows a flow when automatically associating the request context information and the user context information contained in the determination context descriptive information in the mobile terminal 4. It is assumed that the number of sequences of the request context to be associated is L, and the number of levels of the determination context descriptive information is M.

When the determination context management server 3 connectable by the short range wireless communication section 27 cannot be searched (NO in step S20), a step 20 is repeated. The determination context management server 3 connectable by the short range wireless communication section 27 is searched (YES in step S20), the sensor usage environment ID of the connectable determination context management server 3 is obtained and stored in the environment ID storage 18 (step S21).

If the context association determining section 21 determines that a non-associated application ID does not exist (NO in step S22), a flow is terminated. If the context association determining section 21 determines that the non-associated application ID exists (YES in step S22), the determination context descriptive information of the determination context management server 3 is obtained by the determination context description request/storage 22 and stored therein (step S23).

When the determination context descriptive information is stored, then a flow is terminated if the non-associated application ID that has not been compared by the comparison section 38 does not exist (NO in step S24). The non-associated application to be associated is selected and the sequences of the request context information are specified (step S25), if the non-associated application ID that has not been compared by the comparison section 38 exists (YES in step S24).

The sequences of the request context information are specified, the context sequence level control section 23 sets the sequence number "i" of the request context information as "1" (step S26). If the sequence number "i" of the request context information is larger than the number of sequences L of the request context information for the non-associated application (YES in step S27), the already associated context sequences stored in the attribute registration section 26 is stored in the user using application database 17a by being associated with request context information (in step S29). The context sequences are stored in the user using application database 17a, then the procedures return to step S24 and are repeated until the non-associated application that has not been determined no more exits.

If NO in step S27, the context sequence level control section 23 outputs the location attribute of the request context information of the sequence number "i" to the comparison section 38 (in step S28). The location attribute is output to the comparison section 38, then the context sequence level control section 23 sets the level number "j" as "1" (in step S30). If the level number "j" is larger than the number of levels, "M" of the determination context descriptive information (YES in step S31), the procedures return to step S24.

If NO in step S31, and the location attribute comparison section 24 determines that the location attribute of the "i_th" request context information and the location attribute of the user context information of the level number "j" do not coincide (NO in step S32), the context sequence level control section 23 sets the level number "j" of the user context information as "j+1" (in step S33), then the procedures return to step S31 and are repeated until the level number "j" becomes "M".

If YES in step S32, and the level number "j" is larger than "M" (YES in step S32), the procedures return to step S24. If NO in step S34, and the condition attribute comparison section 25 determines that the condition attribute of the "i_th" request context information and the condition attribute of the user context information of the level number "j" do not coincide (NO in step S35), the context sequence level control section 23 sets the level number "j" of the user context information as "j+1" (in step S36), then the procedures return to step S34 and are repeated until the level number "j" becomes "M".

The condition attribute comparison section 25 determines that the condition attribute of the "i_th" request context information and the condition attribute of the user context information of the level number "j" coincide (YES in step S35), the attribute registration section 26 stores the user context information that has coincided as the corresponding context information by associating it with the request context information (step S37). The determination context descriptive information is stored in the attribute registration section 26, then the context sequence level control section 23 sets the sequence number "i" of the request context information as "i+1" (step S38), and the procedures return to step S27 and are repeated until the sequence number "i" becomes "L".

Figure 9:
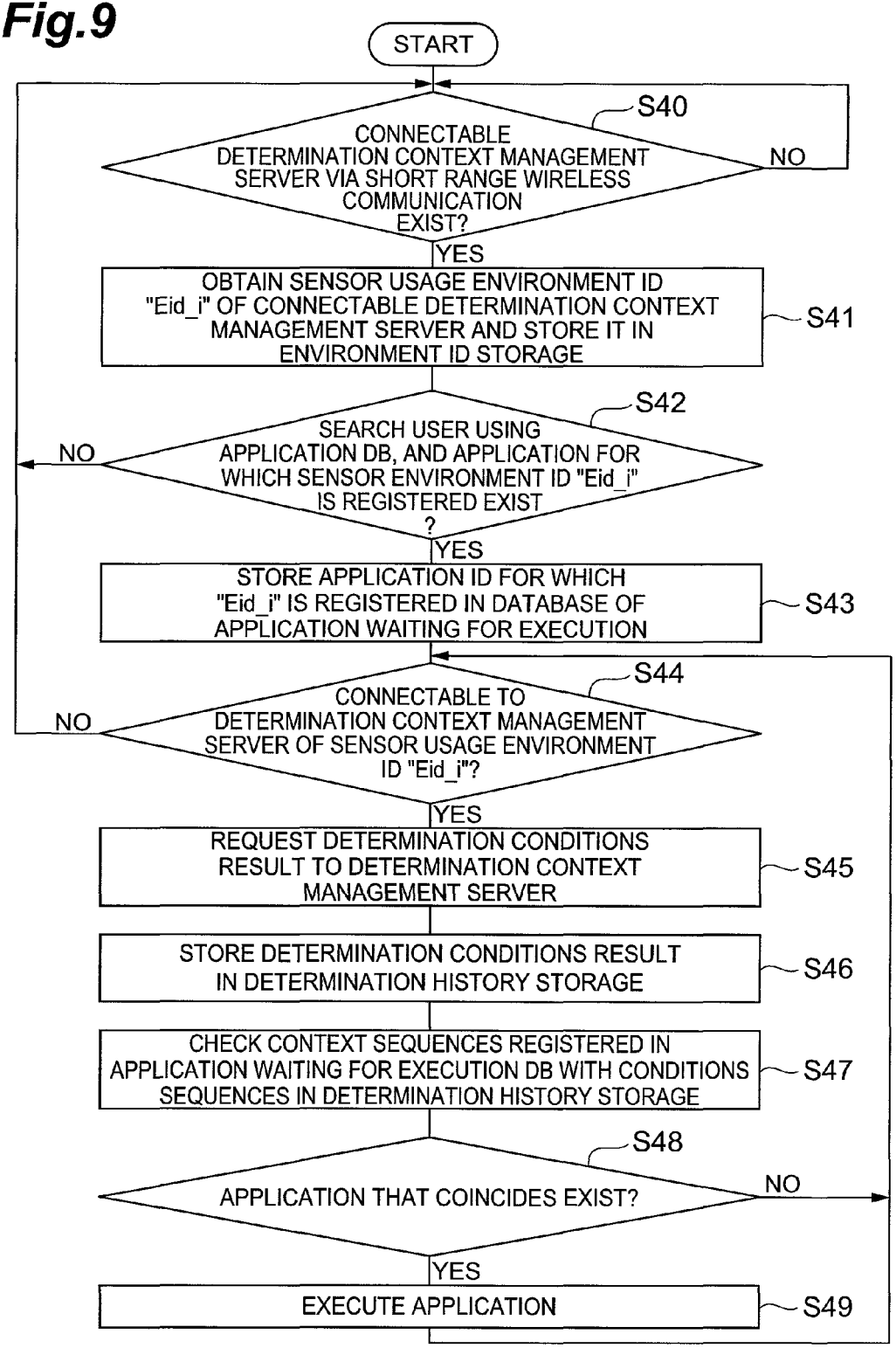
FIG. 9 is a diagram illustrating an application execution flow according to an embodiment of the present invention.

In this way, the request context information and the user context information contained in the determination context descriptive information can be automatically associated. Subsequently, a flow of executing an application with which the request context information is associated will be described referring to FIG. 9. FIG. 9 shows a flow of executing the application.

When the determination context management server 3 connectable by the short range wireless communication section 27 has been searched (YES in step S40), the sensor usage environment ID of the connectable determination context management server 3 is obtained by the environment ID storage 18 and stored therein (step S41). The sensor usage environment ID is stored in the environment ID storage 18, and if the execution application searching section 28 determines that an application ID associated with the sensor usage environment ID stored in the user using application database 17a does not exist (IF NO in step S42), the procedures return to step S40.

If YES in step S42, the application pointer and the condition attribute of the corresponding context information corresponding to the relevant application ID are stored in the application waiting for execution database 29a by being associated with the application ID (step S43). In case where connecting to the determination context management server 3 having the sensor usage environment ID stored in the environment ID storage 18 is impossible (IF NO in step S44), the procedures return to step S40.

If YES in step S44, the determination result receiver 30 requests the condition determination result information to the determination context management server 3 (step S45). The condition determination result information returned from the determination context management server 3 according to the request is stored in the determination history storage 31 (step S46). When the condition determination result information is stored in the determination history storage 31, the application execution determination section 32 checks the sequences of the condition attribute associated with each application registered in the application waiting for execution database 29a with the condition sequences in the determination history storage 31 (step S47).

As a result of a check, the condition sequence that has coincided exists in the determination history storage 31 (IF YES in step S48), the application execution section 33 executes the relevant application (step S49). If No in step S48, or if the application is executed, the procedures return to step S44.

In this way, an appropriate application is executed in each environment.

Next, the effects of the mobile terminal 4, the method of executing an application, the determination context management server 3, and the context using application registration server 2 of the present embodiment will be described.

In the mobile terminal 4, the sensor usage environment ID indicating the sensor usage environment 6 in which the user is located, and the corresponding context information indicating the user context are preliminary stored in the user using application storage 17, by being associated with the application ID specifying the application to be executed. In any sensor usage environment 6, the short range wireless communication section 27 receives the sensor usage environment ID and the determined condition determination result information from the determination context management server 3. Based on the received sensor usage environment ID and the condition determination result information, the application execution determination section 32 determines the application ID and the application execution section 33 may execute the application corresponding to the determined application ID. By this configuration, as condition determination result information that can execute an application is specified in each sensor usage environment 6 even if the user moves among a plurality of different sensor usage environments 6, in which receivable determination result information is different, the application may be appropriately executed in each sensor usage environment 6.

The user using application storage 17 of the mobile terminal 4 further, stores in advance the request context information indicating the user context which is a requirement of executing the application by associating it with the application ID. In case the sensor usage environment ID that has been received is not registered in the user using application storage 17, the determination context description request/storage 22 obtains the determination context descriptive information from the determination context management server 3 delivering the determination context descriptive information describing a set of the user context information for determining the user's context. Based on the obtained determination context descriptive information and the request context information stored in the user using application storage 17, the generating section 39 generates the corresponding context information and stores the generated corresponding context information and the sensor usage environment ID, by associating them with the application ID corresponding to the request context information. By this configuration, it is possible to generate the corresponding context information for executing the application even if the user moves to the sensor usage environment 6, in which the sensor usage environment ID is not registered for the application ID. Therefore, it is possible to execute the appropriate application even if the user moves to the sensor usage environment 6 in which the condition determination result information to be received is different.

The user presentation section 35 of the mobile terminal 4 presents selectably any user context information to the user based on the determination context descriptive information, and the condition association input section 36 accepts any user context information among the presented user context information with the user's operation, and accepts the accepted context element as the corresponding context information. The attribute registration section 26 may register the accepted corresponding context information and the received sensor usage environment ID in the application ID corresponding to the request context information. By this configuration, it is possible to generate the corresponding context information using information input by the user even if the user moves to the sensor usage environment 6 in which the corresponding context information for executing the application cannot be automatically generated. Therefore, it is possible to execute the more surely appropriate application even if the user moves to the sensor usage environment 6 in which the receivable condition determination result information is different.

Further, the request context information contains the location attribute indicating a location where the user is located, and the condition attribute indicating the user context defined according to the location attribute, and the determination context descriptive information describes the location attribute indicating a location where the user is located, and the condition attribute indicating the user conditions according to the location attribute in a tree structure. Based on the location attribute contained in the request context information, the generating section 39 in the mobile terminal 4 extracts the user context information corresponding to the request context information within the search range of the defined condition attribute. In this way, it is possible to limit the range within which the user context information is extracted to reduce the burden for generating the corresponding context information.

Further, by assigning the sequence numbers to the corresponding context information, it is configured such that the information contains information indicating the change in the user context, and by associating information indicating an order with the condition determination result information, it is configured such that the condition determination result information contains information indicating the change in the user context. Based on the corresponding context information and the result information, the application execution determination section 32 in the mobile terminal 4 may determine application specifying information. By this configuration, it is possible to execute the corresponding application based on meticulous information like the change in user context, and execute an application according to the user context more appropriately.

In the determination context management server 3, the sensor information obtaining section 10 obtains sensor information output from the sensor groups $37_1$~$37_n$, the condition determination section 15 generates the condition determination result information based on the obtained sensor information. The request response section 12 transmits the mobile terminal 4 the generated conditions determination result information and the sensor usage environment ID indicating the sensor usage environment 6 in which the determination context management server 3 is assigned as the sensor usage environment 6 in which the user is located. It is, therefore, possible to obtain the condition determination result information which can be appropriately handled in the mobile terminal 4 and the sensor usage environment ID, and cause the mobile terminal 4 to execute the appropriate application.

Further, the determination context description storage 14 of the determination context management server 3 stores the determination context description information describing a set of the user context information for determining the user context. The request response section 12 receives a request for delivering the determination context descriptive information from the mobile terminal 4, and returns the determination context descriptive information stored in the determination context description storage 14. Therefore, even if the corresponding context information does not exist in the mobile terminal 4, the determination context management server 3 may transmit the determination context descriptive information for generating the corresponding context information. Therefore, even if the mobile terminal 4 moves to the sensor usage environment 6 in which the receivable condition determination result information is different, it is possible to generate the appropriate corresponding context information.

Further, the context using application registration server 2 stores in the context using application storage 9, the application ID specifying the application, the application pointer for executing the application corresponding to the application ID, and the request context information indicating requirements of executing the application by associating them with each other. The application request response section 7 receives the application ID from the mobile terminal 4, reads the application pointer and the request context information corresponding to the application ID and returns them. By this configuration, it is possible to transmit the request context information which is requirements of executing the application together with the application pointer defining where the application is saved to the mobile terminal 4, and mobile terminal 4 may easily obtain the request context and the application pointer for executing the application.

The present invention is not limited to the above embodiment but various modifications thereof may be made. For example, in the above-mentioned embodiment, it is configured such that the mobile terminal 4 receives the determination context descriptive information via the short range wireless communication, however, a communication method needs not to be limited to the short range wireless communication. For example, in case where the determination context management server 3 is registered in a global network which can connect to the global network like Internet, the mobile terminal may receive the determination context descriptive information via a network. Therefore, even if the user together with the mobile terminal 4 does not move to specified environment, it is possible to previously receive the determination context descriptive information to store by associating the request context information with the determination context descriptive information.

Further, in the above-mentioned embodiment, it is configured such that the mobile terminal 4 comprises the request context associating section 19, however, there may be a case where the mobile terminal 4 does not comprise the request context association section 19.

Further, in the above-mentioned embodiment, a case where the mobile terminal 4 comprises the user presentation section 35 and the condition associating input section 36 has been described, however, there may be a case where the mobile terminal 4 does not comprise the user presentation section 35 and the condition associating input section 36.

Further, the user using application storage 17 may store the sensor usage environment ID and the corresponding context information in user using application database 17a for the application obtained via a network such as the Internet.

The invention claimed is:

1. A mobile terminal comprising:
a storage device configured to store, in an association with application specifying information that identifies an application to be executed, request context information identifying a user's context that is a condition for executing the application, environment specifying information indicating an environment in which a user of the mobile terminal is located, and corresponding context information indicating the user's context;
a receiver configured to receive one environment specifying information and one result information from a context management server assigned to an environment in which the user is located, the one environment specifying information indicating the environment, and the one result information indicating the user's context in the environment as detected by the context management server, which is stored in one corresponding context information by the storage device;
a determination unit configured to determine, by querying the storage device, whether an association exists between (a) the one corresponding context information, including the one environment specifying information and the one result information received by the receiver, and (b) one application specifying information stored in the storage device;
a processor configured to execute an application corresponding to the one application specifying information when (1) the determination unit determines that the association exists and (2) one request context information associated with the one application in the storage device coincides with the one corresponding context information, so that the corresponding context information satisfies a condition for executing the application that is established by the one request context information;
an obtaining unit configured to request and obtain, in response to the determining unit determining that the association does not exist, one determination context descriptive information from the context management server, the one determination context descriptive information describing a set of context elements for determining the user's context; and
a generating unit configured to generate corresponding context information based on the request context information stored in the storage device and the determination context descriptive information obtained by the obtaining unit, and storing and registering the generated corresponding context information in the storage device in an association with the one application specifying information, wherein
the processor executes the application corresponding to the one application specifying information when the one request context information associated with the one application in the storage device coincides with the generated corresponding context information, so that the generated corresponding context information satisfies a condition for executing the application that is established by the one request context information.

2. The mobile terminal according to claim 1, the generating unit including:
a presentation unit for selectably presenting a user with any context elements based on the determination context descriptive information;
an input unit for accepting any context elements among the context elements presented by the presentation means with the user's input operation, and accepting the accepted context elements as the corresponding context information; and
a registration unit for storing in the storage device, the corresponding context information accepted by the input unit and the environment specifying information received by the receiver, in association with the application specifying information corresponding the request context information.

3. The mobile terminal according to claim 1, wherein:
the request context information contains a location attribute indicating a location where a user is located and a condition attribute indicating the user's context defined according to the location attribute;
the determination context descriptive information describes context elements composed of the location attribute indicating a location where the user is located and the condition attribute indicating the user's context defined according to the location attribute in a tree structure; and
the generating unit extracts the context elements corresponding to the request context information within a search range of the condition attribute defined based on the location attribute contained in the request context information to generate the corresponding context information based on the extracted context elements.

4. The mobile terminal according to claim 1, wherein:
the corresponding context information contains information indicating a change in the user's context;
the one result information contains information indicating a change in the user's context; and
the determining unit determines application specifying information based on the corresponding context information and the one result information.

5. A context management server comprising:
an environment specifying information storage device configured to store environment specifying information indicating environment;
a sensor information obtaining unit configured to obtain sensor information output from a sensor;
a generating unit configured to generate result information based on the sensor information obtained by the sensor information obtaining unit, and
a transmitter configured to transmit the result information generated by the generating unit and the environment specifying information to the mobile terminal according to claim 1.

6. A context management server comprising:
a context descriptive storage device configured to store determination context descriptive information describing a set of context elements for determining user's context;
a receiver configured to receive a delivery request of the determination context descriptive information from the mobile terminal according to claim 1; and
a responder configured to return the determination context descriptive information stored in the context descriptive storage device, when receiving the delivery request from the receiver of the context management server.

7. An application registration server comprising:
a storage device configured to store application specifying information for specifying an application, execution information for executing the application corresponding to the application specifying information and request context information indicating requirements of the execution of the application by associating them with one another; and
a responder configured to read, when receiving application specifying information from the mobile terminal according to claim 1, the execution information and the request context information corresponding to the received application specifying information from the storage device and return them.

8. A context management server comprising:
an environment specifying information storage device configured to store environment specifying information indicating environment;
a sensor information obtaining device configured to obtain sensor information output from a sensor;
a generating unit configured to generate result information based on the sensor information obtained by the sensor information obtaining unit; and
a transmitter configured to transmit the result information generated by the generating unit and the environment specifying information to the mobile terminal according to claim 1.

9. A context management server comprising:
an environment specifying information storage device configured to store environment specifying information indicating environment;
a sensor information obtaining unit configured to obtain sensor information output from a sensor;
a generating unit configured to generate result information based on the sensor information obtained by the sensor information obtaining unit; and
a transmitter configured to transmit the result information generated by the generating unit and the environment specifying information to the mobile terminal according to claim 2.

10. A context management server comprising:
an environment specifying information storage device configured to store environment specifying information indicating environment;
a sensor information obtaining unit configured to obtain sensor information output from a sensor;
a generating unit configured to generate result information based on the sensor information obtained by the sensor information obtaining unit; and
a transmitter configured to transmit the result information generated by the generating unit and the environment specifying information to the mobile terminal according to claim 3.

11. A context management server comprising:
an environment specifying information storage device configured to store environment specifying information indicating environment;
a sensor information obtaining unit configured to obtain sensor information output from a sensor;
a generating unit configured to generate result information based on the sensor information obtained by the sensor information obtaining unit; and
a transmitter configured to transmit the result information generated by the generating unit and the environment specifying information to the mobile terminal according to claim 4.

12. A context management server comprising:
a context descriptive storage device configured to store determination context descriptive information describing a set of context elements for determining user's context;
a receiver configured to receive a delivery request of the determination context descriptive information from the mobile terminal according to claim 2; and
a responder configured to return the determination context descriptive information stored in the context descriptive storage device, when receiving the delivery request from the receiver of the context management server.

13. A context management server comprising:
a context descriptive storage device configured to store determination context descriptive information describing a set of context elements for determining user's context;
a receiver configured to receive a delivery request of the determination context descriptive information from the mobile terminal according to claim 3; and
a responder configured to return the determination context descriptive information stored in the context descriptive storage device, when receiving the delivery request from the receiver of the context management server.

14. An application registration server comprising:
a storage device configured to store application specifying information for specifying an application, execution information for executing the application corresponding to the application specifying information and request context information indicating requirements of the execution of the application by associating them with one another; and
a responder configured to read, when receiving application specifying information from the mobile terminal according to claim 1, the execution information and the request context information corresponding to the received application specifying information from the storage device and return them.

15. An application registration server comprising:
a storage device configured to store application specifying information for specifying an application, execution information for executing the application corresponding to the application specifying information and request context information indicating requirements of the execution of the application by associating them with one another; and
a responder configured to read, when receiving application specifying information from the mobile terminal according to claim 2, the execution information and the request context information corresponding to the received application specifying information from the storage device and return them.

16. An application registration server comprising:
a storage device configured to store application specifying information for specifying an application, execution information for executing the application corresponding to the application specifying information and request context information indicating requirements of the execution of the application by associating them with one another; and
a responder configured to read, when receiving application specifying information from the mobile terminal according to claim 3, the execution information and the request context information corresponding to the received application specifying information from the storage device and return them.

17. An application registration server comprising:
a storage device configured to store application specifying information for specifying an application, execution information for executing the application corresponding to the application specifying information and request context information indicating requirements of the execution of the application by associating them with one another; and
a responder configured to read, when receiving application specifying information from the mobile terminal according to claim 4, the execution information and the request context information corresponding to the received application specifying information from the storage device and return them.

18. A method of executing an application comprising:
storing, in storage means of a mobile terminal in an association with application specifying information that identifies an application to be executed, request context information identifying a user's context that is a condition for executing the application, environment specifying information indicating an environment in which a user of the mobile terminal is located, and corresponding context information indicating the user's context;
receiving one environment specifying information and one result information from a context management server assigned to an environment in which the user is located, the one environment specifying information indicating the environment, and the one result information indicating the user's context in the environment as detected by the context management server, which is stored in one corresponding context information by the storage means;
determining, by querying the storage means, whether an association exists between (a) the one corresponding context information, including the one environment specifying information and the one result information received in the receiving, and (b) one application specifying information stored in the storage means;
executing an application corresponding to the one application specifying information when (1) the determining results in a determination that the association exists and (2) one request context information associated with the one application in the storage means coincides with the one corresponding context information, so that the corresponding context information satisfies a condition for executing the application that is established by the one request context information;
requesting and obtaining, in response to the determining results in a determination that the association does not exist, one determination context descriptive information from the context management server, the one determination context descriptive information describing a set of context elements for determining the user's context;
generating corresponding context information based on the request context information stored in the storage means and the determination context descriptive information obtained by the requesting and obtaining; and
storing and registering the generated corresponding context information in the storage means in an association with the one application specifying information, wherein
the executing includes executing the application corresponding to the one application specifying information when the one request context information associated with the one application in the storage means coincides with the generated corresponding context information, so that the generated corresponding context information satisfies a condition for executing the application that is established by the one request context information.

* * * * *